United States Patent [19]

Stropkay

[11] 4,095,427

[45] Jun. 20, 1978

[54] LINEAR ACTUATOR LINKAGE

[75] Inventor: Edward J. Stropkay, Chesterland, Ohio

[73] Assignee: Design & Manufacturing Corporation, Willoughby, Ohio

[21] Appl. No.: 710,598

[22] Filed: Aug. 2, 1976

[51] Int. Cl.² ............................. F16J 1/10; F01B 9/00
[52] U.S. Cl. .......................................... 60/530; 92/84; 92/128; 92/137
[58] Field of Search ................... 92/84, 137, 138, 128; 60/530; 74/501 R; 251/63.4

[56] References Cited

U.S. PATENT DOCUMENTS

| | | | |
|---|---|---|---|
| 1,779,030 | 10/1930 | Brodbeck et al. | 92/137 |
| 2,847,033 | 8/1958 | Baker | 92/84 |
| 3,160,836 | 12/1964 | Farley | 92/84 |
| 3,797,324 | 3/1974 | Sheesley | 92/138 |

FOREIGN PATENT DOCUMENTS

| | | | |
|---|---|---|---|
| 293,489 | 7/1928 | United Kingdom | 92/137 |

*Primary Examiner*—Paul E. Maslousky
*Attorney, Agent, or Firm*—Maky, Renner, Otto & Boisselle

[57] ABSTRACT

A flexible coiled linear actuator linkage is disclosed. The linkage couples the piston rod of a linear actuator to a rotatable control arm having a pivot axis perpendicular to the longitudinal movement of the piston rod during its power stroke. The linkage is threaded onto the piston rod of the linear actuator for a positive anchorage at one end and is secured by a connection loop onto a thrust lever of the control arm at the other end. During a positive displacement of the piston rod, the linkage transforms the longitudinal linear motion of the actuator into a pivotal rotary motion by a bending flexure of its body. A plurality of release loops for facilitating the disassembly of the connection between the actuator and the control arm are further provided according to another aspect of the invention.

19 Claims, 7 Drawing Figures

LINEAR ACTUATOR LINKAGE

BACKGROUND OF THE INVENTION

1. Field of the Invention

The invention pertains generally to mechanical actuator systems and is more particularly directed to motion transmitting linkages for linear actuators.

2. Prior Art

Actuators are mechanical apparatus which transform a pressure change (generally fluidic) into the physical displacement of a work element. In a linear actuator this work element is usually a piston rod that can be employed to produce useful work (force x distance) in operating switches, valves, or other mechanisms which require actuation.

There are at least two known types of linear actuator in wide use today. One type of linear actuator is referred to as a thermal actuator wherein the fluid pressure is increased by the application of heat to a thermally expansible material or the like within the actuator, as is disclosed, for example, in a U.S. Pat. No. 3,805,528.

The other type of linear actuator in wide use today is a fluidic actuator which is operated in response to a differential in pressure caused by pumping increasing volumes of fluid into a cylinder. The fluidic actuator can be either pneumatic or hydraulic depending upon the gaseous or liquid state of the actuating fluid. All of these devices are advantageous in that they provide a mechanical force useful over their working distance in a single direction.

However, there are instances in which rotational actuation is needed. Many times a valve will open by turning or rotating the check stem rather than by a linear pushing motion. Another particular need for rotary actuation is for pivoting the control arms of dampers in ventilation or heating systems. In the past, these rotational actuations with linear actuators have been accomplished by various linkages generally including a series of lever arms and pivots.

These complicated arrangements have been subject to mechanical wear and resultant play in the connecting elements. The mechanical play inherent or created in such linkages requires that the device be calibrated periodically or risk a non positive actuation of the rotating device.

Further, service and replacement of such parts is hampered by the relatively difficult disassembly necessitated by the physical connections of pivots and levers. This can be specifically problematic for heating and ventilating systems in vehicles which are typically mounted in rather inaccessible places such as a dashboard.

SUMMARY OF THE INVENTION

A flexible coiled linkage is employed to transform the single direction motion of a linear actuator into a rotational force useful in pivoting a control arm wherein the arm has a pivotal axis substantially perpendicular to the linear motion of the actuator. In a preferred embodiment, the linkage is formed of a multiplicity of coils wound from a rod shaped flexible material into an elongated tubular body.

One end of the linkage is attached to the piston rod of the linear actuator and the other end to the thrust lever of the control arm. Each end of the linkage includes means integral with the body for facilitating the assembly and disassembly of the linkage to the piston rod and thrust lever. During a positive displacement of the piston rod, the linkage transforms the longitudinal linear motion of the actuator into a pivotal rotary motion by a bending flexure of its body.

The invention by providing a flexible body which applies a force even when the actuator is not operating assures a positive actuation of the control arm in either direction and is not as subject to wear as a lever-pivot combination would be. The capability of flexing over an extended range also allows the linkage to connect elements that may be positioned over a wider range of tolerances and placements.

Therefore, it is an object of the invention to provide a linkage for a linear actuator that will transform the linear motion of the actuator into rotary motion of a control arm.

Accordingly, it is another object of the invention that the linkage provide means for the facile assembly and disassembly to the actuator and control arm.

Still another object of the invention is to provide a linkage for a linear actuator that may be used over a wide range of tolerances and placements.

A further object of the invention is the positive actuation and closure of the control arm by the linkage over extended periods of use.

These and other objects, features and advantages of the invention will be more fully understood and appreciated upon reference to the following detailed description taken in conjunction with the appended drawings wherein:

DETAILED DESCRIPTION OF THE PREFERRED EMBODIMENT

Figure 1:
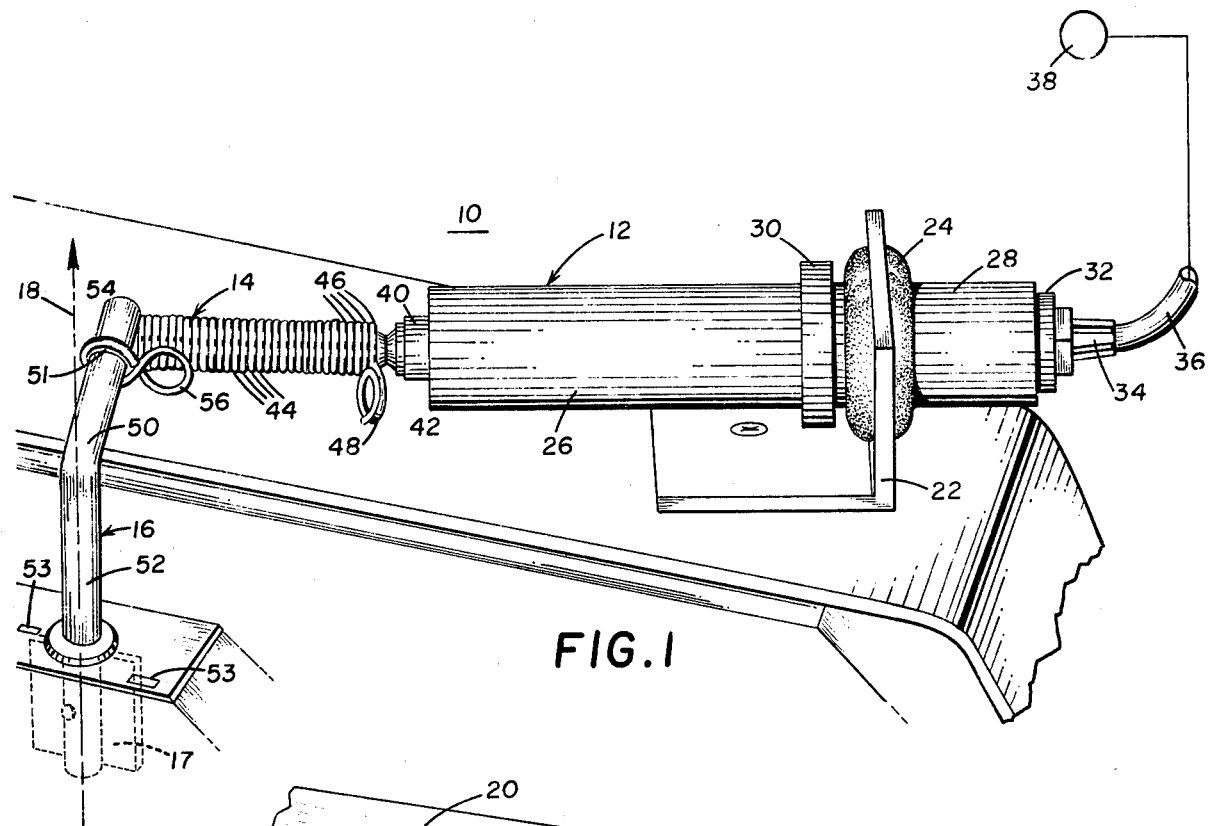
FIG. 1 is a perspective view of an actuator system constructed in accordance with the invention, the system is illustrated in an unoperated state.

With reference now to FIG. 1, there will be described one preferred embodiment of an actuator system constructed in accordance with the invention. Generally designated 10 the actuator system comprises a linear actuator 12, an actuator linkage 14, and a control arm 16 which pivots about an axis 18.

The linear actuator 12 is positioned in the system 10 by being supported on a generally flat support base 20 to which is affixed a mounting bracket 22. The upper leg of the mounting bracket 22 has a centrally located aperture into which an elastomeric gromet 24 has been fitted. Preferably the linear actuator 12 is securely mounted by the gromet 24 to define a linear force direction for its action.

The linear actuator generally comprises a cylinder 26, and a cylinder head 28. The cylinder head 28 is sealed at one end by an end cap 32 which admits a pressure fitting 34. Fluidic pressure from a source 38, shown schematically, is provided to the cylinder head 28 upon an actuation signal through a hose 36 connected to and communicating with the pressure fitting 34.

As is conventional, the actuation command creates an increased fluid pressure within the cylinder head and causes the motion of a piston (not illustrated in FIG. 1) within the cylinder 26. The piston transmits this motion to a piston rod 40 connected thereto. This power stroke usually develops a measurable amount of force over the piston rod stroke (distance) to create work or a force $x$ distance product. The piston rod 40 narrows into a connecting neck portion 42 and then flares into a threaded stud end (not visible). A fluidic linear actuator has been described in detail and it is evident either hydraulic or pneumatic fluid may be used to advantage. Additionally a thermal actuator as described in the referenced U.S. Pat. No. 3,805,528 could be used or any other conventional linear actuator producing a force directed in a single direction.

The flexible coiled linkage 14 extends longitudinally from the piston rod 40 in the direction of the motion attributed to the linear actuator 12. The linkage comprises a generally tubular body formed of flexible coils 44. The coils 44 are preferably manufactured from a rod shaped material having a relatively high elastic modulus. For example, a fairly high quality spring steel or the like would suffice with particular parameters being more fully described hereinafter. The stiffness of the tubular body for the linkage 14 is sufficient that the body is substantially non-compressible but is flexible enough to allow elastic longitudinal extension of the body without adverse consequences. Preferably, the tubular body will flex and bend at least 90° to the longitudinal axis of the actuator piston rod 40.

At one end of the tubular body of the linkage 14 a plurality of coils 46 are screwed onto the threaded stud end of the piston rod 40. The pitch and thread density of the threads 40' of the stud end preferably will substantially match the coil density and pitch of the coils 46 to produce a secure anchorage. This feature allows assembly of the linkage 14 to the piston rod 40 without the use of tools and in a facile manner.

To permit the easy disassembly of the linkage 14 from the piston rod 40 the coils 46 are equipped with a piston rod release loop 48. The release loop 48 is formed with a center axis of the loop substantially parallel to the longitudinal axis of the linkage. As a consequence when the release loop 48 is lifted in a direction so as to unwind the coils 46, the linkage 14 may be easily removed from the threaded end of piston rod 40. This lifting can be accomplished by finger pressure or by inserting a prying lever through the loop 48 to open the coils 46 to the extent needed for removal.

Attached at the opposite end of the linkage 14 is the rotatable control arm 16. The control arm 16 comprises preferably an axis arm 52 and a thrust lever 50. The axis arm 52 is generally rod shaped with its longitudinal axis substantially coincident with the pivot axis 18. The thrust lever 50 juts from the axis arm 52. The axis arm is attached to a controlled load 17 illustrated in FIG. 1 as a phantom ventilation damper rotated in a closed position against stops 53.

Depending on the angle the thrust lever 50 makes with the axis arm, higher or lower torques will be exerted on the axis arm 52 and load 17. The longer the lever arm of the thrust lever 50 the more torque that will be applied for a given force from the linkage 14. It is evident that the maximum torque will be applied when the lever arm is perpendicular to the axis arm as is illustrated in the preferred embodiment of FIG. 1.

The linkage is positively secured to the thrust lever 14 by means of an integral connection loop 54. The loop 54 slides over the end of the lever 50 and is wrapped to hold the position in which it is placed. The loop is formed with its central axis substantially perpendicular to the longitudinal axis of the tubular body of the linkage 14 in order to provide the circumference of the loop 54 as a means to push or pull on the thrust lever 50. In a preferred form the thrust lever 50 is equipped with a notch 51 which locks the connecting loop 54 into place. The connection loop 54 is positioned to the inside of the tubular body to provide a fulcrum point for bending the flexible body of the linkage 14 and to significantly reduce any slippage tendency. The assembly of the connection loop is also easily accomplished without tools or the like. The connection loop 54 is further provided with an integrally formed release loop 56. The release loop 56, similar to the release loop 48, provides a facile means for disconnecting the linkage from the thrust lever. Either operated manually or with an auxiliary lever the loop 56 may be used to open the connecting loop 54 and release the thrust lever 50.

Thus, it has been shown the linkage provides integral assembly and disassembly means which are used advantageously according to one of the objects of the invention.

Figure 2:
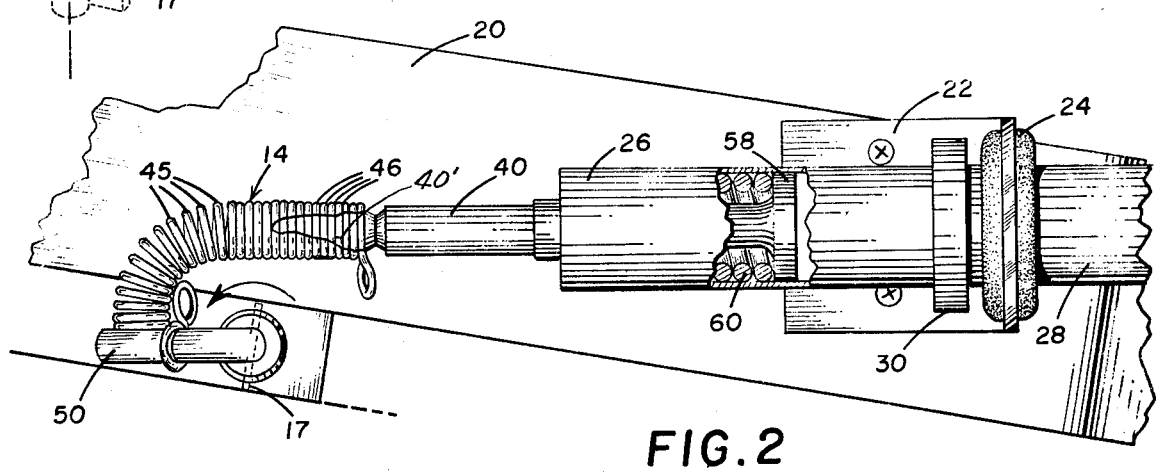
FIG. 2 is a top plan view, partially broken away, of the actuator system illustrated in FIG. 1 in an operated state.

With reference now to FIG. 2, the actuator system 10 is shown in an operated state where a piston 58 has been transported by fluid pressure during a power stroke to extend piston rod 40. A return spring 60 will produce a force oppositely directed to the motion of the piston for closing the piston 58 once the increased pressure has been released.

In operation the piston rod 40 pushes the linkage 14 to a point where the consequent rotary motion of the thrust lever 50 begins to displace or bend the linkage 14 away from its longitudinal coincidence with the axis of the rod. The tubular body of the linkage 14 flexes increasingly by opening coils 45 as the linear force of the piston rod 40 outstrokes and the rotary motion of the thrust lever 50 continues.

The flexible coiled body thereby permits the linkage to follow the rotary motion of the thrust lever 50 by opening its coils and simultaneously to continue to transmit the force of the piston rod to the lever. Thus a facile transformation of the linear motion of the actuator into the rotary motion of the actuator into the rotary motion of the control lever is accomplished.

In the illustration, the action produces a full quarter rotation of the thrust lever 50 to its open position (shown as pivoted 90° from the home or closed position.) If a greater angular rotation is necessitated by design considerations the linkage will continue the flexure as the piston is outstroked further. A positive opening of the controlled load 17 is provided in this manner according to one of the objects of the invention.

The linkage 14 may also be prestressed provided with a predetermined offset force which the load must overcome in order to produce flexure. When a prestress is used an additional advantage found is that the linkage will tend to snap the load open once the offset is exceeded thereby assuring the operation of a critical valve or the like. In the nonoperated position the prestress will cause a slight positive closure force to be exerted even when the linkage is unflexed.

For reversing the operation, the pressure in the cylinder head 28 is released and the return spring 60 moves the piston 58 to its unoperated position. The piston rod 40 moves in concert with the piston to pull the linkage 14 therewith. The linkage 14 transmits this force to the thrust lever 50 and pulls the controlled load 17 closed while unflexing. Of course the load applied to the linkage cannot be greater than the spring constant of the linkage 14 or that of the return spring 60 or the lever 50 will not rotate closed.

In an embodied system illustrative values for the actuator system disclosed could include a 15 lb. linear actuator with approximately a 1 inch stroke. A linkage 14 comprising an extension spring of approximately one inch with a spring constant of 7 lbs./in having a 0.24 inch diameter and a wire size of 0.031 inches can be used with such an actuator. The linkage is preferably pre-stressed to 0.7 lbs. A preferable thrust lever length is on the order of 0.75 to 1.25 inches but can be longer for heavier loads. The amount of load such a system can operate sucessfully with will vary with positioning and coupling losses, but is generally a substantial percentage of the work product deliverable from the actuator.

While some preferred values for an advantageous system have been suggested, these should not be taken as limiting the invention in any manner. In general for heavier loads, more torque will be needed for rotation thus requiring longer lever arms, higher spring constants, and more powerful actuators. The length to diameter ratio of the linkage 14 should be adjusted to assure an adequate flexure for the turning radius during rotation with a generally elongated tubular shape being maintained. The diameter of the linkage being substantially that of the piston rod as hereinfore disclosed.

Figure 3:
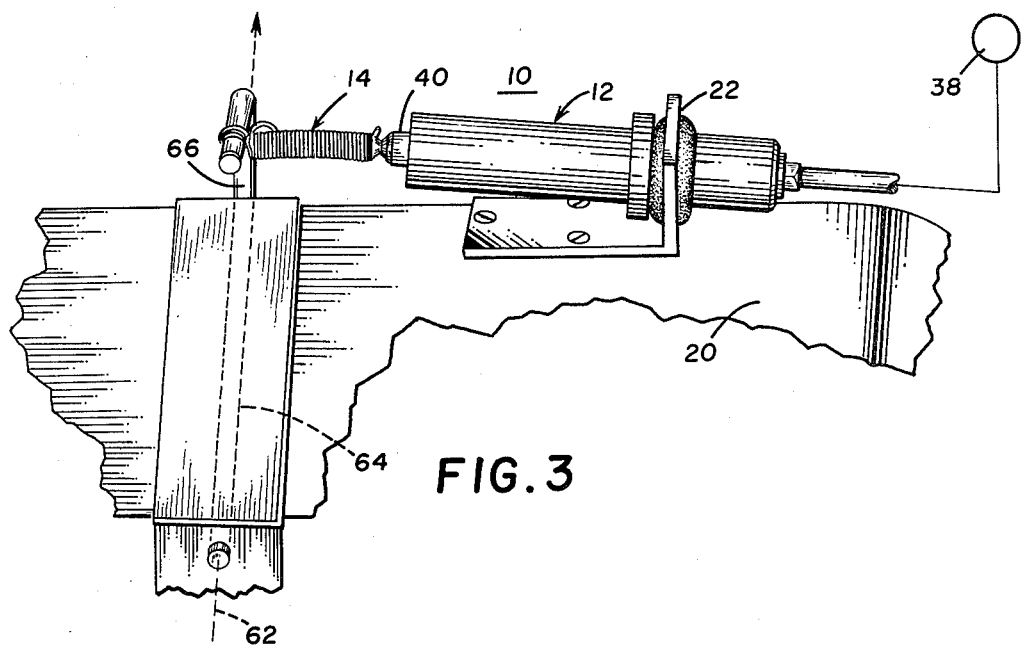
FIG. 3 is a perspective view, partially broken away, of the actuator system illustrated in FIG. 1 with the control arm mounted for rotation about an alternative axis. The system is illustrated in an unoperated state.
Figure 4:
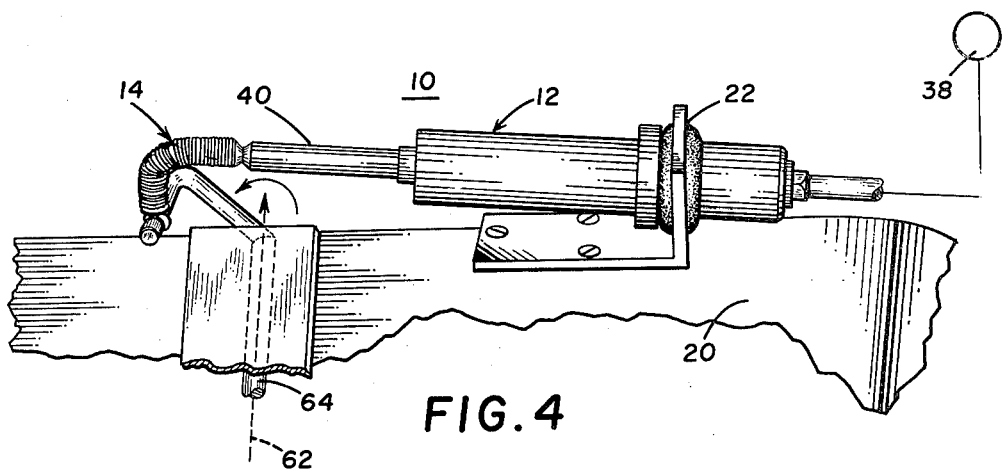
FIG. 4 is a perspective view, partially broken away, of the actuator system illustrated in FIG. 3 in an operated state.

FIGS. 3 and 4 show the linear actuator system with a control arm 64 pivoting about an alternative axis 62. The axis 62 is still substantially perpendicular to the linear motion of the piston rod 40, but lies horizontally to the support base 20 instead of vertically. The linkage 14 is connected to the control arm by an L shaped thrust lever 66 which produces torque about the rotational axis 62. FIG. 3 shows the closed position for the system 10 and FIG. 4 illustrates the piston rod 40 extended, the linkage 14 bent, and the control arm 64 rotated about axis 62 in accordance with the invention.

Figure 5A:
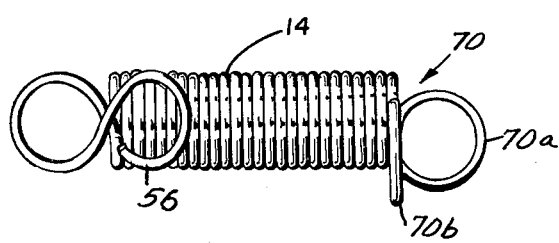
FIGS. 5A–C are enlarged front views of alternative embodiments of a flexible actuator linkage for the system illustrated in FIG. 1.
Figure 5B:
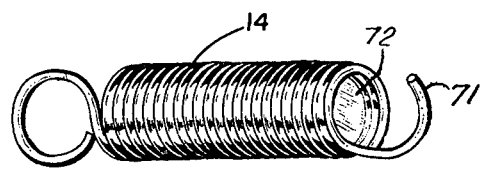
Figure 5C:
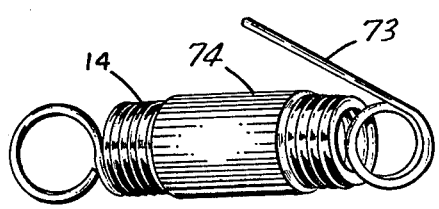

FIGS. 5A-C illustrate alternative embodiments of the linkage 14 having various means for releasing the linkage from the piston rod and thrust lever. FIG. 5A discloses a double release loop 70, having one coil 70a parallel to the tubular body of the linkage 14 and one coil 70b perpendicular thereto. This configuration permits access to at least one of the loops in either perpendicular direction when the actuator system is mounted in a substantially inaccessible position such as in a vehicular ventilation system.

FIG. 5B illustrates a release bend 71 useful in opening the coils 46. The bend 71 is employed when a lever may be easily inserted parallel to the tubular body and is not designed for manual release. The linkage 14 in FIG. 5B is shown without the connection loop 54. Additionally, in FIG. 5B means for reinforcing the actuator linkage 14 during periods of heavy loading are illustrated, such means being a flexible rod 72, either elastomeric or metal, which is placed within the inner bore of the body of the linkage 14 and extends at least a portion of the length of the linkage. The internal mounting of the rod 72 permits a flexure of the linkage 14 when a greater than usual force is applied to the linkage. This configuration is advantageous in overcoming the increased inertia and torques presented to the linkage by heavier loads.

FIG. 5C illustrates a release means 73 similar to the bend 71 but which has an arm extended at an angle from the tubular body. The release means 73 is preferably used for manual disassembly of the linkage 14 from the system. The linkage 14 in FIG. 5C is shown without the connection loop 54. Further, a reinforcing means has been included for opening heavy loads. A substantially inflexible tube 74 is mounted over the tubular body of the linkage 14 to restrict the flexure of the linkage to the ends thereof. An increased amount of force is necessary to create such a flexure and therefore the higher inertias of heavier loads can be overcome in a facile manner. The reinforcing means 74 can also be somewhat flexible to allow flexure away from the terminal ends of the linkage 14 to a small extent.

While preferred embodiments of the invention have been disclosed, it will be understood that various modifications obvious to one skilled in the art can be made thereto without departing from the spirit and scope of the invention as covered by the appended claims.

What is claimed is:

1. An actuator system for rotating a controlled load about a pivot axis comprising:
    linear actuator means for producing a force in a linear direction through a predetermined distance by generally linear movement of a piston rod in response to an actuation signal;
    a control arm, said control arm having a longitudinal axis and being connected to the controlled load, the longitudinal axis of said control arm forming said pivot axis, and a thrust lever connected to said control arm to provide a lever arm by which said control arm may be rotated; and
    actuator linkage means for coupling said piston rod to said thrust lever, said linkage means comprising means for transforming the linearly directed force of said piston rod into rotary motion about the pivot axis of said control arm by an elastic flexure of said linkage means, and including an integral tubular body formed of flexible coils aligned longitudinally with said piston rod and having sufficient rigidity to apply to said thrust lever a pushing force produced by said piston rod upon actuation thereof, said tubular body also being longitudinally flexible to produce a bending of elastic flexure out of said alignment when said piston rod is actuated to continue applying such pushing force to said thrust lever rotating the same about said pivot axis.

2. An actuator system as defined in claim 1, wherein said thrust lever is perpendicular to said pivot axis of said control arm and said linkage means is coupled to said thrust lever to pivot the same at least 90° from a home position.

3. An actuator system as defined in claim 2, wherein said linkage means further includes means for facilitating the assembly of said piston rod to said linkage means and the assembly of said linkage means to said thrust lever.

4. An actuator system as defined in claim 3, wherein said linkage means further includes:
    means for facilitating the disassembly of said piston rod from said linkage means and the disassembly of said linkage means from said thrust lever.

5. An actuator system as defined in claim 4, wherein said linear actuator means includes operating means for actuating said linear actuator means in response to an increase in fluidic pressure.

6. An actuator system as defined in claim 5, wherein said operating means includes means for applying a pneumatic fluid pressure increase to operate said actuator means.

7. An actuator system as defined in claim 5, wherein said operating means includes means for applying hydraulic fluid pressure increase to operate said actuator means.

8. An actuator system as defined in claim 5, wherein said operating means includes means for applying thermal energy to said actuator means to obtain such fluid pressure increase.

9. An actuator system as defined in claim 1, wherein said linkage means further includes means for reinforcing said tubular body during heavy loading thereof.

10. An actuator system as defined in claim 9, wherein said means for reinforcing is located internally of said tubular body.

11. An actuator system as defined in claim 10, wherein said means for reinforcing comprises a flexible rod with a longitudinal axis substantially coincident with that of said tubular body and extending at least a portion of the length of said tubular body.

12. An actuator system as defined in claim 9, wherein said means for reinforcing is located externally of said tubular body.

13. An actuator system as defined in claim 12, wherein said means for reinforcing comprises an inflexible tube with a longitudinal axis substantially coincident with that of said tubular body and extending at least a portion of the length of said tubular body.

14. A flexible coiled actuator linkage for transforming the linear power stroke of an actuator into rotary motion about a pivot axis of a control arm, said linkage comprising:
   an elongated tubular body formed of flexible coils; said tubular body having a longitudinal axis, being elastically elongatable and being elastically flexible in order to bend at least 90° to the longitudinal axis of said tubular body;
   first means for connecting one end of said linkage to said actuator in longitudinal alignment therewith; and
   second means for connecting the other end of said linkage to said control arm;
   said tubular body also having sufficient rigidity to apply to said control arm a pushing force produced by said actuator upon actuation thereof, said tubular body being capable of elastic flexure when said actuator is actuated to continue applying such pushing force to said control arm while rotating the same about said pivot axis, said actuator includes a piston rod with threads at one end and said first means includes a plurality of end coils of said tubular body having the approximate diameter of said piston rod and with approximately the same thread density; and wherein said linkage is screwed onto said threads of said piston rod.

15. An actuator linkage as defined in claim 14, wherein said second means includes a connecting loop formed substantially perpendicular to the longitudinal axis of said tubular body of said linkage and integral therewith, said connecting loop being sufficiently large relative to said control arm and positionable with respect to the same to slide over said control arm.

16. An actuator linkage as defined in claim 15, wherein said linkage further includes first release means for releasing said second connecting means.

17. The actuator linkage as defined in claim 16, wherein said linkage further includes second release means for releasing said first connecting means.

18. A flexible coiled actuator linkage for transforming the linear power stroke of an actuator output piston rod which has a threaded end into rotary motion about a pivot axis of a control arm, said linkage comprising:
   an elongated tubular body formed of flexible coils; said tubular body having a longitudinal axis, being elastically elongatable, and being elastically flexible in order to bend at least 90° to the longitudinal axis of said tubular body;
   means for connecting one end of said linkage to said piston rod in longitudinal alignment therewith, said means for connecting said linkage to said piston rod including a plurality of end coils of said tubular body having the approximate diameter of said piston rod and with approximately the same thread density, said linkage being screwed onto the threads of said piston rod; and
   means for connecting the second end of said linkage to said control arm, said means for connecting said linkage to said control arm including a connecting loop formed substantially perpendicular to the longitudinal axis of said tubular body of said linkage and integral therewith, said control arm connecting loop being adapted to slide over said control arm;
   said linkage further including means for releasing said linkage to control arm connecting means and means for releasing said linkage to piston rod connecting means, said linkage to control arm release means including a first release loop formed parallel to and connected to said control arm connecting loop, said first release loop being formed such that a lever inserted therethrough may be used to open said control arm connecting loop.

19. An actuator linkage as defined in claim 18, wherein said linkage to piston rod release means includes a second release loop formed parallel to said tubular body and adjacent the first coil threaded onto said piston rod, said second release loop being formed such that a lever may be inserted therethrough to open the coils of said linkage to piston rod connecting means.

* * * * *